ATTILIO BEER, DEC'D.
CESIRA BEER, WIDOW OF CONTE DECIO BONAMINI, HEIR-AT-LAW.
ELECTROMECHANICAL SYSTEM TO AVOID RAILWAY COLLISIONS.
APPLICATION FILED JUNE 21, 1909.

1,132,427.

Patented Mar. 16, 1915.
7 SHEETS—SHEET 1.

ATTILIO BEER, DEC'D.
CESIRA BEER, WIDOW OF CONTE DECIO BONAMINI, HEIR-AT-LAW.
ELECTROMECHANICAL SYSTEM TO AVOID RAILWAY COLLISIONS.
APPLICATION FILED JUNE 21, 1909.

1,132,427.

Patented Mar. 16, 1915.
7 SHEETS—SHEET 3.

ATTILIO BEER, DEC'D.
CESIRA BEER, WIDOW OF CONTE DECIO BONAMINI, HEIR-AT-LAW.
ELECTROMECHANICAL SYSTEM TO AVOID RAILWAY COLLISIONS.
APPLICATION FILED JUNE 21, 1909.

1,132,427.

Patented Mar. 16, 1915.
7 SHEETS—SHEET 4.

WITNESSES:

INVENTOR
Attilio Beer

ATTILIO BEER, DEC'D.
CESIRA BEER, WIDOW OF CONTE DECIO BONAMINI, HEIR-AT-LAW.
ELECTROMECHANICAL SYSTEM TO AVOID RAILWAY COLLISIONS.
APPLICATION FILED JUNE 21, 1909.

1,132,427.

Patented Mar. 16, 1915.
7 SHEETS—SHEET 5.

Fig.4.

UNITED STATES PATENT OFFICE.

ATTILIO BEER, OF VENICE, ITALY; CESIRA BEER, WIDOW OF CONTE DECIO BONAMINI, HEIR AT LAW OF SAID ATTILIO BEER, DECEASED.

ELECTROMECHANICAL SYSTEM TO AVOID RAILWAY COLLISIONS.

1,132,427.   Specification of Letters Patent.   Patented Mar. 16, 1915.

Application filed June 21, 1909. Serial No. 503,488.

*To all whom it may concern:*

Be it known that I, ATTILIO BEER, a subject of the King of Italy, residing at Venice, Italy, civil engineer, have invented certain new and useful Improvements in Electromechanical Systems to Avoid Railway Collisions, of which the following is a specification.

This invention relates to block signaling systems for railways and has for its object to provide an improved system of this kind in which the block instruments are interlocked with one another and also with the signals in such a manner that it is impossible to set a starting signal for a train at a station unless the track rails of the section to be passed over by the train are intact and are not occupied by another train or by an engine or vehicle.

Further features of the invention consist in the special construction and operation of certain of the component devices of the system as will now be described.

The invention is illustrated in the accompanying drawings of which—

Figures 1 and 1ª constitute a diagrammatic view showing a signaling system according to the invention as applied to a single line of track between two stations. Fig. 1ᵇ is a detail view of a switch and operating means therefor.

Figures 1, 1B:
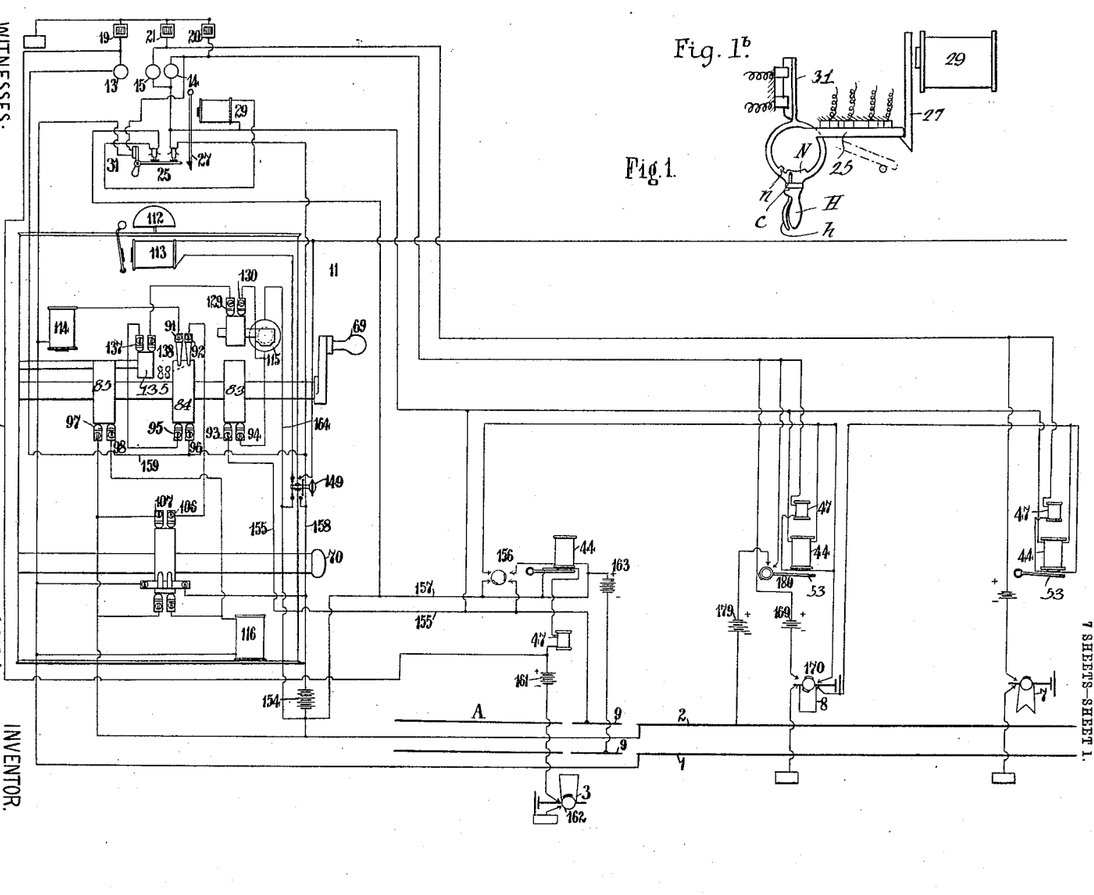
Figure 1A:
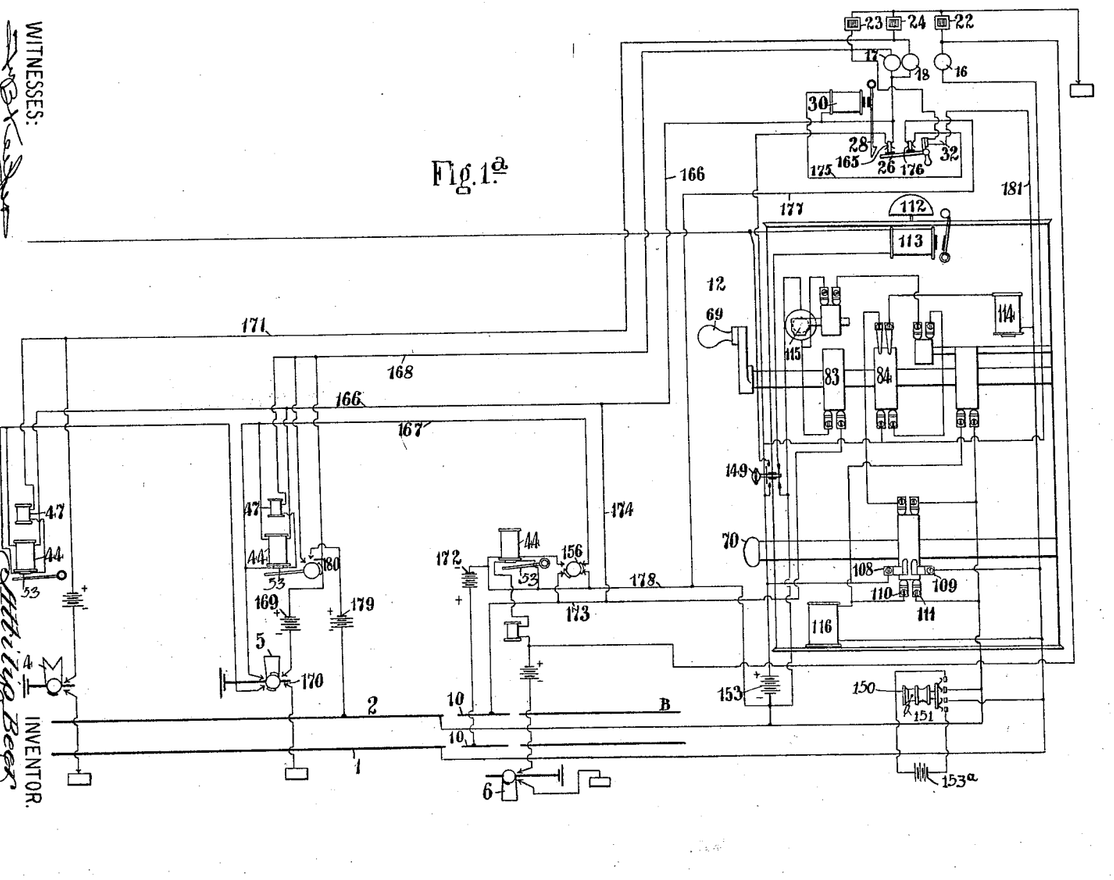

Referring now to Figs. 1 and 1ª, a section of a single track railway system between the two stations A and B is indicated as comprising a pair of rails 1, 2 and provided with starting, distant and home signals 3, 4, 5, respectively for the control of traffic proceeding in the direction A to B and with starting, distant and home signals 6, 7, 8, respectively for the control of traffic in the opposite direction.

The several lengths of rail comprising the rails 1, 2 are electrically bonded in the usual manner, the rails 1, 2 being, however, insulated from one another so that they may be employed as electric conductors for communication between the signal cabins and other purposes. Immediately adjacent to the termini A, B are situated short lengths 9, 10 respectively of insulated track rails forming part of a local electric circuit.

The control of the starting and other signals of the system is effected by means of receiving and transmitting instruments 11, 12 situated respectively at the stations A and B and by means of signal push buttons 13, 14, 15 and 16, 17, 18 with which are also connected indicators 19, 20, 21 and 22, 23, 24 respectively. Double switches 25, 26 are also provided and are adapted to be held in their closed position by catches 27, 28 provided with releasing magnets 29, 30 respectively. Other switches 31, 32 at the stations A and B respectively are also provided and are adapted to be opened and closed by hand by the opening and closing mechanism of the double switches 25, 26 in such a manner that the switches 31, 32 are closed after and opened before the switches 25 and 26, and are capable of remaining closed when the double switches 25, 26 open automatically in the working of the system, as will be more fully described hereinafter. A suitable construction of switch for this purpose is illustrated in Fig. 1ᵇ, but any other construction may be adopted which will operate in the manner above described.

The double switch according to Fig. 1ᵇ has two separate switch blades 25 and 31 pivoted upon the same spindle. The handle H is attached to switch blade 31 and is provided with a latch $c$ capable of engaging in a small notch $n$ in the hub of the switch blade 25, the said latch being actuated by a handle $h$. In proximity to this small notch $n$ the hub is also provided with a large notch N adapted to allow free movement to the latch $c$ over a small arc of a circle when the latch is disengaged from the small notch $n$ and is made to engage in the said large notch N.

Two switch contacts are shown arranged vertically for coöperation with the switch blade 31 while two pairs of switch contacts are also arranged horizontally for coöperation with the switch blade 25, the latter being adapted for engagement with the spring catch 27 which is acted upon by the electromagnet 29, these parts and contacts together with the circuits controlled thereby being as shown diagrammatically at the upper part of Figs. 1 and 1ª. It is to be noted that the object is to first close the switch blade 25 and afterward the switch blade 31, also that in case it should be desired to again open the double switch by hand in order to cancel a previously given permission for the advance of a train the switch blade 31 is to be opened first and afterward the switch blade 25.

The operation of the switch is as follows: When it is desired to bring the double switch into closed position the latch c is brought into engagement with the small notch n in the hub of switch blade 25. The handle H is now moved to the right in the direction to close the switches; switch blade 25 first engages the two pairs of horizontally arranged fixed contacts and is supported in this position by the spring catch 27. The latch c is now raised out of the small notch n and the switch handle H is moved farther to the right until the latch c engages in the large notch N; the switch handle is now free to be moved sufficiently far to the right to force the switch blade 31 into engagement with the vertically arranged fixed spring contacts coöperating therewith, in which position the double switch is firmly secured in its closed position and the handle may be released.

If it should be desired to open the switch before the advance of the train the operator seizes the switch handle H and after raising the latch c moves the handle to the left and thus disengages the switch blade 31 from its coöperating fixed contacts. The latch c is now allowed to reëngage in the small notch n in the hub of switch blade 25 and the spring catch 27 is then pressed to the right and the double switch automatically falls into its open position as shown in dotted lines. When the switch blade 25 is opened automatically by a passing train, in the manner described hereinafter, the engagement of the train with the short rails 9, 9 (Fig. 1) closes a circuit from the battery 163 through the electromagnet 29, which being energized attracts its armature, thus withdrawing the catch 27 and allowing the switch blade 25 to fall to the open position but without moving switch blade 31 which remains closed.

The preferred construction and operation of the mechanism for operating the signals 3, 4, 5, &c., will now be described with reference to Fig. 2, in which the semaphore arm is arranged to be electrically actuated by means of the electric motor 33 which is connected to the shaft 34 through suitable gearing, the motor shaft being provided with a ratchet device 35 so as to insure rotation in one direction only. The shaft 34 carries a disk 36 provided with one or more pins 37 adapted to engage with slots in a winding drum 38 loosely mounted upon the shaft 34. The disk 36 is keyed on to the shaft 34 and the winding drum 38 is arranged to be held in engagement with the pins 37 on the disk 36 by means of a weighted bell crank lever 39, 40 and to be moved out of engagement with the said pins by means of arms 41 pivoted at 42 and attached to lever 43 forming the armature of an electro-magnet 44. The lever 43 when released from the electromagnet 44 falls and causes the arms 41 to move the winding drum 38 out of engagement with the pins 37 against the action of the weighted bell crank lever 39, 40 so as to effect a disengagement of the winding drum 38 from the motor 33.

The motor 33 is indicated as supplied with energy from a battery 45 in the circuit of which is included a switch 46 arranged to be closed by an electro-magnet 47 against the action of a weight 48, the armature 49 and the weight 48 being mounted on opposite arms of a lever arranged to be retained in its attracted position, when moved thereto by the electro-magnet 47 by means of a weighted catch 50 having a releasing arm 51.

The electro-magnet 44 is provided with an auxiliary armature 52 which, when the electro-magnet is energized, closes a switch 53 connected in the circuit of the electromagnet 47.

The signal is operated by means of a cord 54 attached to a lever 55 and adapted to be wound upon the drum 38 as will be hereinafter described. The lever 55 is pivoted at 56 and is connected to the signal rod 57. The finger 58 is pivoted at 59 and is connected by means of a rod 60 to the lever 43. A pin or projection 61 on the lever 55 serves to move the lever 43 forming the armature of the electro-magnet 44 within magnetizable distance from the poles of the latter as the lever 55 is pulled down by the motor 33 in setting the signal. The lever 55 is also provided with a pin 62 adapted, when in its lowest position to engage with the releasing arm 51 of the catch 50. The rod 60 is provided with a pin 63 adapted to engage with a pivoted lever 64 carrying a movable contact 65 adapted to coact with fixed contacts 66, 67, so that the finger 58, when released by the disengagement of the pin 61, will close the switch 65, 66, 67 which is prevented from opening rapidly by means of a dash pot 68. This switch is only necessary at local signals and serves to close the circuit which unlocks the block instruments. The switch is actuated by the local signal returning to its danger position when an arriving train has passed the said signal, as will be more particularly described hereinafter.

The operation of the apparatus for moving the signal is as follows:—Upon the electro-magnet 44 being energized the auxiliary armature 52 is attracted and closes the switch 53, thereby connecting the electro-magnet 47 in circuit, so that if the circuit of this electro-magnet is afterward completed the electro-magnet will be energized and will move its armature 49 to close the switch 46, the armature 49 being held in its closed position by means of the catch 50. The motor circuit is thus closed and the winding drum 38 being operated by the motor will wind up the cord 54 and draw the lever 55 into its lowest position, thereby operating the signal rod 57 to move the signal to the safety or "off" position.

The first part of the movement of the lever 55 raises the finger 58 by means of the pin 61 thereby raising the armature 43 within magnetizable distance of the electro-magnet 44 as described above. The lever 55 will continue to move downward until the pin 62 strikes the releasing arm 51 of the catch 50 thereby allowing the switch 46 to open and interrupting the motor circuit, the signal will therefore remain in the safety position until the current in the electro-magnet 44 is interrupted, in which case the lever 43 will fall freely and bring the arms 41 into engagement with the winding drum 38 so as to move it out of engagement with the pins 37. The counterweight on the signal arm will then move the signal back to the danger position, the cord 54 being unwound from the winding drum 38 which is now disconnected from the motor 33. It should be noted that the auxiliary armature 52 is pivotally mounted in such a manner as to maintain the switch 53 in its open position when the electro-magnet 44 is de-energized.

As will be described in connection with the system illustrated in Figs. 1 and 1ª, an electrical circuit is required to be closed during the return of the home signal to the danger position and this is accomplished by means of the switch 65, 66, 67, as stated above, which is not required on the starting and distant signals.

Figure 3:
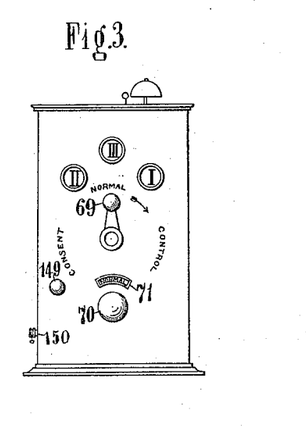
Fig. 3 is a view in front elevation of one of the transmitting and receiving instruments of the system, Figs. 4 and 5 being sectional views in front and side elevation respectively of the instrument shown in Fig. 3.

The construction of the transmitting and receiving instruments indicated at 11 and 12 in Figs. 1 and 1ª will now be described with reference to Figs. 3, 4, 5, 6, 7 and 8. Referring first to Fig. 3, the instrument is shown as provided with a handle 69 adapted to occupy one or other of three positions indicated by the words "normal", "control" and "consent." A knob 70 underneath the handle 69 is also adapted to occupy one or other of three positions indicated by the words "normal", "consent" and "blocked" which are marked upon a disk 73ª fixed upon the shaft 73 (Fig. 5) and which appear successively at an opening 71. At the top of the instrument case are three circular openings I, II, III, at each of which a red or green disk appears for indicating purposes. The three positions of the handle 69 are situated at 120° apart from one another while the knob 70 when moved in the clockwise direction through an angle of 90° from the "normal" position causes "consent" to be indicated at the opening 71 and when moved a further 90° the word "blocked" appears in a similar manner.

Figure 4:
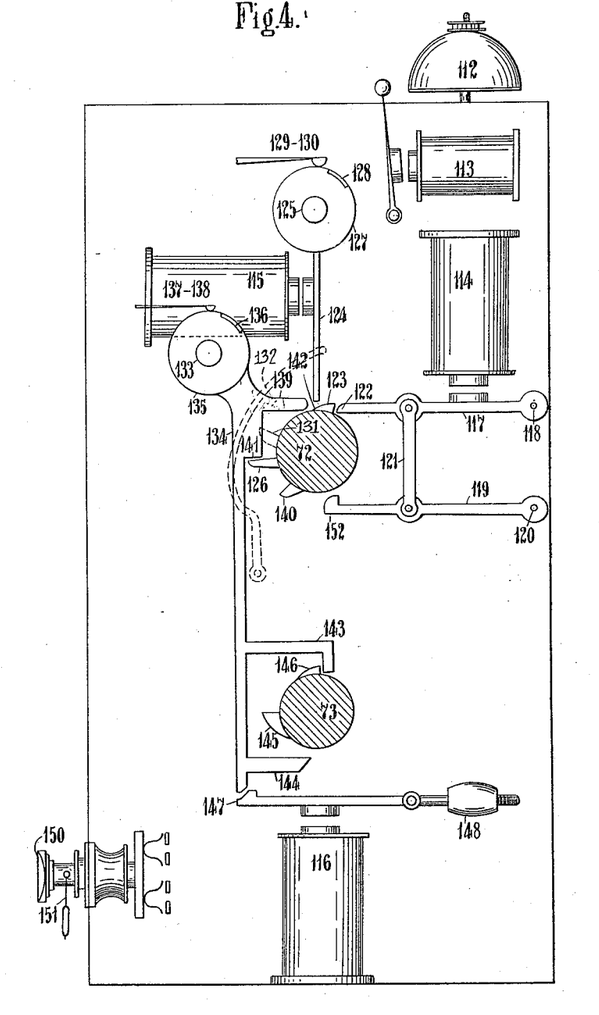
Figure 5:
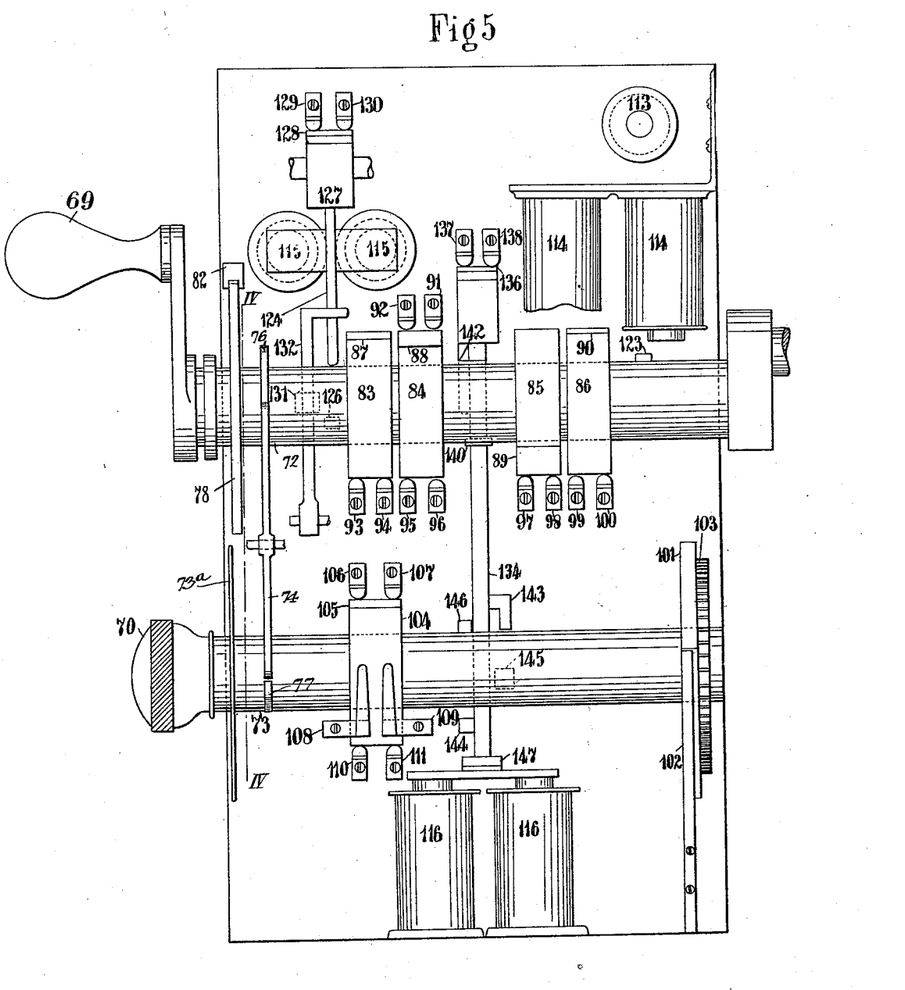
Figure 6:
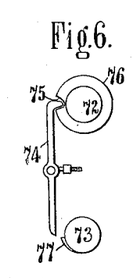
Figs. 6, 7 and 8 are detail views of portions of the instrument shown in Figs. 3 and 4.
Figure 7:
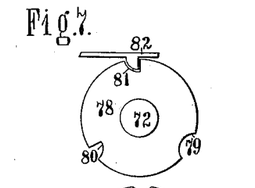
Figure 8:
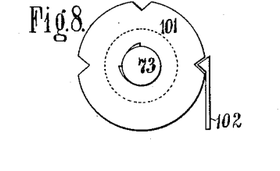
Figure 9:
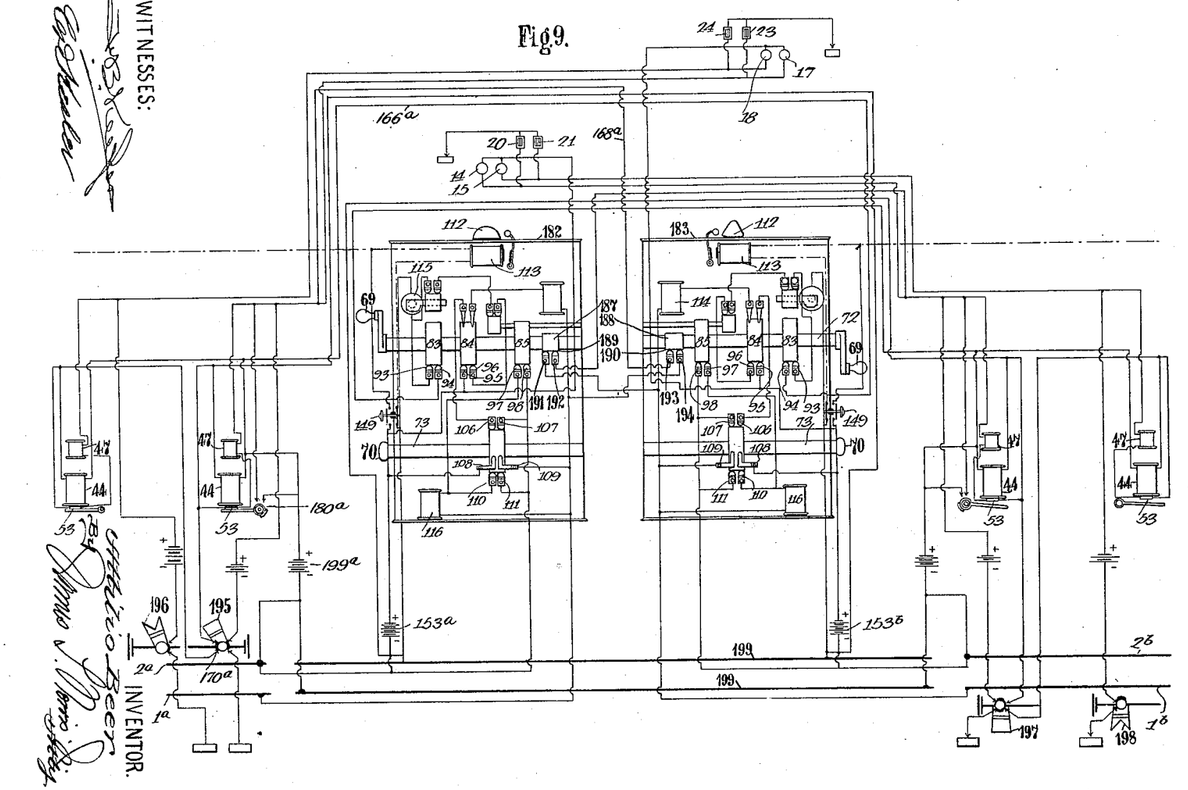
Fig. 9 is a diagrammatic view similar to Fig. 1 illustrating the arrangement and connections of the receiving and transmitting instruments at a signal cabin situated at an intermediate point of the track.

Referring now to Figs. 4 and 5, the handle 69 is rigidly connected to a shaft 72 and the knob 70 to a shaft 73; the shaft 73 is locked in its normal position by means of the locking device 74 shown in Fig. 6 when the handle 69 is moved from its normal position. The said locking device comprises a lever, one end of which engages in a notch 75 in a disk 76 attached to the shaft 72 when the handle is in the normal position. When the latter is moved from the normal position the lever 74 is forced out of the notch 75 and its opposite end is brought into engagement with a projection 77 on the shaft 73 so as to prevent movement of the latter in a clockwise direction when the handle 69 is in any other position than the normal. The shaft 72 is supported in the case of the instrument and can be attached to the locking frame of the signaling system by means of a crank if desired. Mounted on the shaft 72 immediately behind the front of the case of the instrument is a disk 78 (see Fig. 7) the edge of which is provided with three notches 79, 80, 81 with which a bar 82 engages to determine the three positions into which the handle 69 may be set. The three notches are disposed 120° apart and while the notches 81 and 80 are so shaped that the disk 78 can only be moved in the clockwise direction, the third notch 79 (corresponding to the position of "consent" of the handle 69) is so formed as to permit of it returning to the "control" position of the handle 69 in which further movement is stopped by the notch 80. The shaft 72 carries four insulating drums 83, 84, 85, 86 (see Fig. 5) upon which are mounted respectively the contact pieces 87, 88, 89, 90 which are adapted to engage with five sets of contact fingers 91, 92, 93, 94, 95, 96, 97, 98, 99, 100. The contact plate 90 on the shaft 72 and the contact fingers 99, 100 coacting therewith are only required in the case of intermediate cabins on a single track railway, as hereinafter described with reference to Fig. 9 of the drawings. The contact piece 89 engages with the contact fingers 97, 98, as soon as the handle 69 is in the "control" position and remains in contact with these fingers when the handle 69 is in the "consent" position. The contact piece 88 engages with the contact fingers 91, 92 when the handle 69 is in the "normal" position, and is not disengaged therefrom until the handle has passed a little way beyond the "control" position. The contact piece 88 also engages with the contact fingers 95, 96 when the handle 69 is in the "consent" position. The contact piece 87 is in engagement with the contact fingers 93, 94 when the handle 69 is at the "control" position and remains in engagement therewith when the handle is in the "consent" position. The contact piece 90 engages with the contact fingers 99, 100 when the handle 69 is in the "consent" position, the contact piece 88 being adapted to make contact with its contact fingers 91, 92 a little before the contact piece 90 engages with the contact fingers 99, 100.

The shaft 73 is supported in the case of the instrument similarly to the shaft 72 and its movement is limited by means of a disk 101 somewhat similar to the disk 78, a ratchet being provided with notches with which a position determining member 102 engages when the knob 70 is moved into one or other of its three positions. The shaft 73 is also provided with a ratchet wheel 103 adapted to coöperate with a suitable pawl to prevent movement of the said shaft in a counter-clockwise direction.

Mounted on the shaft 73 is an insulating drum 104 carrying a contact piece 105 adapted to engage successively with three sets of contact fingers 106, 107, 108, 109, 110, 111, corresponding to the "normal" "consent" and "blocked" positions of the knob 70.

Referring now to Fig. 4, a call-bell 112 is mounted on the case of the instrument and is provided with an actuating electro-magnet 113. The transmitting and receiving instrument also comprises electro-magnets 114, 115, 116. The electro-magnet 114 is provided with an armature 117 pivoted at 118 and connected to a lever 119, pivoted at 120, by means of a link 121 so as to form a linked parallelogram. The free end 122 of the armature 117 is adapted to engage with a projection 123. The electromagnet 115 is provided with an armature 124 pivoted at 125 so as to hang perpendicularly downward, the lower end of the armature 124 being adapted to engage with a projection 126 on the shaft 72. The armature 124 is also attached to an insulating drum 127 carrying a contact piece 128 with which contact fingers 129, 130 are adapted to engage when the armature is in its unattracted position. The armature 124 is frictionally mounted on its pivot 125 so that when moved by the projection 126 the said armature will remain in such a position that the contact fingers 129, 130 are in engagement with the contact piece 128. Since the electro-magnet 115 is not under starting conditions sufficiently energized to overcome the friction of the pivot 125 to move the armature 124 from its extreme right hand position, such movement is effected by means of projection 131 on the shaft 72 which engages with a pivoted lever 132 the free end of which replaces the armature 124 in its vertical position (see Figs. 4 and 5).

Mounted on a pin 133 parallel to the shaft 72 is a crank shaped lever 134 to which is attached an insulating drum 135 carrying a contact piece 136 adapted to engage with two contact fingers 137, 138. The lever 134 has a projection 139 adapted to engage with a projection 140 on the shaft 72, while another projection 141 on the lever is adapted to engage with another projection 142 on the shaft 72 (the projection 142 being hidden behind 123 in Fig. 4). The lower part of the crank lever 134 is provided with two projections 143 and 144 adapted to engage respectively with two projections 145, 146 carried on the shaft 73. (The relative locations of the projections 140, 126, 123 and 142 can be more clearly seen in Fig. 5 of the drawings).

The normal position of the crank lever 134 is vertical, but when moved toward the right, by the projection 140 on the shaft 72 engaging with the projection 139, is retained in that position by means of a catch 147 engaging the lower extremity of lever 134 and adapted to be released by means of the electro-magnet 116 against the action of a weight 148.

The armature 117 causes a green or red disk to appear at the opening III according as the electromagnet 114 is energized or not. The position of the armature 124 determines in the same way whether a green or red disk appears at the opening I, thus indicating whether the contact fingers 129, 130 are in engagement with the contact 128 or not.

Mounted on the casing of the instrument are two press buttons one of which 149 is connected in the circuit of the bell electro-magnet 113, the other button hereinafter termed the safety button 150 is provided to enable the signalman to withdraw, in case of necessity, the signal of "consent" already transmitted to another signal cabin and in order to do this it is necessary for a sealed wire 151 to be broken and the button 150 pressed, thereby closing a circuit to allow the crank lever 134 to return to its normal position as will be hereinafter described.

The operation of a single transmitting and receiving instrument will now be described, it being understood that one of these instruments is required for each signal cabin on the railway system as will be more particularly explained hereinafter with reference to Fig. 1.

The normal position of the instrument is with the handle 69 and the knob 70 in the position shown in Fig. 3. The armature 124 is then in such a position that a red disk is shown at the opening I indicating that the switch 128, 129, 130 is in its open position. The crank lever 134 is in its vertical position and a green disk therefore appears at the opening II indicating that the switch 136, 137, 138 is in its open position. The armature 117 is in its lowest position so that a red disk appears in the opening III indicating that the magnet 114 is deënergized. The spindle of each indicating disk may be provided with a small finger or projection adapted to be engaged by a coacting projection on the part which determines the position and movement of the indicating disk, namely, on the armature 124, crank lever 134, and armature 117, respectively. Such mechanical tilting devices are well known and can be made in various ways, as will be readily understood; it is therefore considered unnecessary to further complicate the drawing by illustrating such well known devices.

When the handle 69 is in its normal position the projection 123 engages with the projection 122 on the end of armature 117 so that if it is desired to move the handle from "normal" position to "control" position it is necessary that the magnet 114 should be energized so as to raise the armature 117 and permit the projection 123 to pass the projection 122. If the handle 69 be thus permitted to move to the "control" position its further movement is prevented as the projection 123 comes into engagement with the projection 152 on the end of the lever 119 which is in its highest position owing to the excitation of the magnet 114. In order therefore to enable the handle 69 to be further rotated into the "consent" position, it is necessary that the armature 117 should be again lowered, that is to say, the magnet 114 must be again deënergized. During the movement of the handle 69 from the "control" position toward the "consent" position the projection 126 on the shaft 72 strikes against the armature 124, just after leaving the "control" position and causes the said armature to move to its right hand position to close the switch 128, 129, 130 in which position it is retained by the friction of its pivot as before explained. At the same time the projection 140 on the shaft 72 engages with the projection 139 on the lever 134, thus moving the latter toward the right. This movement has the effect of causing the lower extremity of the lever 134 to pass over the catch 147 so as to be retained in this position and also brings the projection 141 within reach of the projection 142 on the shaft 72 so as to prevent the movement of the handle 69 from the "consent" position to the "normal" position so long as the crank lever 134 is held in its right hand position, from which it can only be released by energizing the electro-magnet 116 acting upon the catch 147. A further effect of this movement of the crank lever 134 is to close the switch 136, 137, 138.

As regards the contact pieces carried on the drums 83, 84, 85, 86 of the instrument these engage with their corresponding contact fingers in the several positions of the handle 69 as follows:—In the normal position of the handle 69 the contact fingers 91, 92 are connected by means of the contact piece 88. When the handle is moved into the "control" position the contact fingers 97, 98 are connected by means of the contact piece 89 and the contact fingers 93, 94 are connected by means of the contact piece 87, the connection between the contact fingers 91, 92 being maintained until just after the handle 69 leaves the "control" position. In moving the handle 69 toward the consent position the contact fingers 99, 100 are connected by means of the contact piece 90 and immediately afterward the contact fingers 95, 96 are connected by means of the contact piece 88 which is now out of engagement with the contact fingers 91, 92. The contact fingers 93, 94 will in this position remain connected by means of contact piece 87. In the normal position of the handle 69 as will be understood from the previous description, a red disk appears at the opening I, a green disk at the opening II and a red disk at the opening III. On moving the handle 69 to the "control" position a green disk will appear at the opening I, a red disk at the opening II and a green disk at the opening III, the electro-magnet 114 being of course necessarily energized to allow this movement of the handle 69; when the said handle has been further moved into its "consent" position a red disk once more appears at the opening III.

The three positions of the knob 70 may now be considered. When the knob is in its "normal" position the contact fingers 106, 107 are connected by means of the contact 105 on the drum 104. When the knob 70 is moved through an angle of 90° to its "consent" position, the contact 105 is disconnected from the contact fingers 106, 107 and engages with contact fingers 108, 109. A further movement of the knob 70 to the "blocked" position causes the projection 145 on the shaft 73 to engage with the projection 143 on the crank lever 134, thereby causing this lever to move toward the right and to be retained in this position by means of the catch 147 as above described. In this position of the crank lever 134 the projection 146 engages with the projection 144 on the lever 134 and the knob 70 is therefore prevented from any further movement. Since the knob 70 can only be turned in the clockwise direction it is therefore completely locked in this position and can only be released by means of the electro-magnet 116. It should be noted that in returning the handle 69 from the "consent" position to the "normal" position, the projection 131 on the shaft 72 engages with the replacing lever 132 and causes the latter to return the armature 124 to its original position so that a red disk appears at the opening I. It should be also noted that this further movement of the handle 69 from "consent" to "normal" can only be effected when the electro-magnet 116 is energized either in the normal operation or by means of the safety button 150 which is only intended to be used when it is desired to withdraw a consent signal already transmitted.

The operation of a system comprising the component devices above referred to will now be described with reference to Figs. 1 and 1ª of the drawings. If a train be assumed to be located at the station A and it is desired to allow the said train to proceed to the station B, the following procedure is necessary:—The signalman at the station A presses the bell button 149 of the instrument 11 a pre-arranged number of times thereby actuating the bell 112 of the instrument 12 at the station B, the bell circuit, when button 149 at station A is pressed to the left, being as follows: from the positive terminal of battery 154, Fig. 1, through the right hand contact on spindle of button 149 and the fixed contacts coöperating therewith, to the line wire, thence through the magnet winding 113 of bell 112 at station B, through the right hand contact on spindle of button 149, Fig. 1ª, normally closing the circuit through the fixed contacts coöperating therewith, thence through the adjacent conductor and the connection to rail 2, through rail 2, and back to the negative side of battery 154, Fig. 1. The signalman at the station B thereupon repeats the bell signal by means of the corresponding button 149 of the instrument 12 thus acknowledging the call. If the signalman at the station B is prepared to receive the train he moves the knob 70 of the instrument 12 into its "consent" position thereby establishing a circuit from the battery 153 as follows:—from the positive terminal of the battery 153 through the contact fingers 108, 109 and contact 105 of instrument 12, rail 1, electro-magnet 114, contact fingers 91, 92, contact 88, contact fingers 106, 107 and contact 105 of instrument 11, rail 2, back to the negative pole of the battery 153, magnet 114, of instrument 11 being thereby energized. The signalman at A being notified thereof by a green disk appearing at the opening III moves the handle 69 of the instrument 11 into the "control" position and afterward again calls the signalman at B by means of the bell. The signalman at B thereupon moves the knob 70 of the instrument 12 to the "blocked" position thereby breaking the circuit of the battery 153 at the contact fingers 108, 109 and at the same time connecting the electro-magnet 116 to the rails 1, 2 at the contact fingers 110, 111, the electro-magnet 114 of the instrument 11 is now deënergized and a red disk reappears at the opening III of this instrument. The signalman at A then moves the handle 69 of the instrument 11 to the "consent" position thereby opening the circuit of electro-magnet 114 at contacts 91, 92 but leaving the electro-magnet 116 of the instrument 11 still connected to the rails 1, 2 through the contact fingers 97, 98, the electro-magnets 116 of both the instruments 11 and 12 being thus connected to the rails 1, 2. The movement of the handle 69 of the instrument 11 to the "consent" position causes a green disk to appear at the opening I, as before explained, and completes a circuit through the electro-magnet 44 of the starting signal 3 from the battery 154 as follows:—from the positive terminal of the battery 154 contact fingers 95, 96, contact piece 88, contact fingers 137, 138, contact piece 136, contact fingers 129, 130, contact piece 128, contact fingers 93, 94, contact piece 87, conductor 155, interlocking switch 156, electro-magnet 44, conductor 157 to the negative terminal of the battery 154.

The interlocking switch 156 shown in Figs. 1 and 1ª is not an essential part of the present invention but may be provided when desired in order to increase the safety of the system. When used, this switch must be moved to the position shown at station A in Fig. 1 when or before the handle is operated, in which position the circuit of the electro-magnet 44 of the starting signal 3 is closed and the circuit of the electro-magnets 44 of the local signal 8 and distant signal 7 is interrupted; on the other hand, when or before the knob is operated the interlocking switch 156 must be moved to the position shown at station B in Fig. 1ª, in which the circuit of the electro-magnets 44 of the local signal 5 and distant signal 4 is made and that of the electro-magnet 44 of the starting signal 6 is interrupted.

The signalman at A can now bring the starting signal 3 into the "off" position by pressing the corresponding signal button 13 so that a circuit is completed from the battery 154 as follows:—from the positive terminal of the battery 154, conductors 158, 159, signal button 13, conductor 160, electro-magnet 47 of the signal 3, conductor 157 to the negative terminal of the battery 154. The electro-magnets 47 and 44 of the starting signal 3 being thus both energized the signal will move to its "off" position as already explained with reference to Fig. 2, and in this position a circuit is completed from a local battery 161 through the signal switch 162, signal indicator 19 and earth, thereby notifying the signalman that the starting signal 3 has fully completed its movement to the "off" position. The train now proceeds toward the station B and immediately after leaving the station A passes over the short rails 9 thereby closing a local circuit through the electro-magnet 44 of the signal 3 from a local battery 163, this local circuit being from the positive terminal of the battery 163 through the short rails 9 and axles of the train, interlocking switch 156, electro-magnet 44 of the signal 3 to the negative terminal of the battery 163.

Another circuit is simultaneously closed through the axles of the train from the positive terminal of the battery 163, short rails 9, conductor 155, contact fingers 93, 94, contact 87, electro-magnet 115, conductor 164, conductor 157, back to the negative terminal of the battery 163. The electro-magnet 115 of the instrument 11 being thus energized by the battery 163, which is more powerful than the battery 154, is able to attract its armature 124 and to break the circuit through the contact fingers 129 and 130 thereby disconnecting the battery 154 from the electro-magnet 44 of the starting signal 3 which is, however, still energized from the local battery 163 so long as any part of the train remains on the short rails 9. Upon the last axle of the train, however, leaving the rails 9, the local circuit from the battery 163 is interrupted and the starting signal 3 returns to its danger position.

The train now proceeds toward station B and the signalman at this point prepares to receive the train past the distant and home signals 4 and 5 respectively in the following manner:—The switches 26 and 32 are first closed and a circuit thereby completed from the positive terminal of the battery 153 through the contacts 165 of the switch 26, conductor 166, the electro-magnet 44 of the home signal 5, conductor 167, interlocking switch 156 of the station B back to the negative terminal of the battery 153. A circuit is at the same time closed from the battery 153 through the releasing electro-magnet 30 of the switch 26, but it is to be noted that battery 153 is not able to energize this electro-magnet sufficiently to cause it to release the switch 26. The signalman at B then presses the signal button 17 and the circuit is completed from the battery 153 through the switch 165, signal button 17, conductor 168, electro-magnet 47 of the home signal 5, conductor 167, interlocking switch 156 to the negative terminal of the battery 153. The home signal 5 is therefore moved to its off position and a local circuit from a battery 169 through the switch 170 of home signal 5, conductor 168, signal indicator 23 at station B and earth is established, thereby notifying the signalman of the movement of the signal 5. The signal switch 170 of home signal 5, in the off position of the latter, also completes a circuit from the battery 153 through the electro-magnet 44 of the distant signal 4 so that the signal 4 will not be set to its off position until after the signal 5. The movement of the distant signal 4 is finally effected by completing the circuit of its electro-magnet 47 through the press button 18, the circuit being from the positive terminal of the battery 153, switch 165, signal button 18, conductor 171, electro-magnet 47 of signal 4, signal switch 170 of signal 5, conductor 167, interlocking switch 156 to the negative terminal of the battery 153.

In case it should be necessary to return signals 4 and 5 to danger before the train has passed the switches 26, 32 are opened by hand, for which purpose the signalman first presses back the spring catch 28; it should be noted that, as explained above, switch 32 is arranged to be opened before switch 26 so as to open the circuit through the releasing electro-magnets 116 and prevent the said circuit from being completed by the return of the signals 4 and 5 to the danger position. The signals 4 and 5 are now both in their off position and the train passes over the short rails 10 thereby closing a circuit from the positive terminal of the battery 172, rails 10 and axle of the train, conductor 173, conductor 174, conductor 166, electro-magnet 30 of the instrument 12, conductor 175, contacts 176 of switch 26, conductor 177, conductor 178, back to the negative terminal of the battery 172.

This is more powerful than battery 153 and the electro-magnet 30 is thereby sufficiently energized to release the switch 26 thereby interrupting the circuit from the battery 153 through the electro-magnets 47, 44 of the signals 4 and 5 respectively; it is to be noted, however, that the switch 32 remains closed. The presence of the train on the short rails 10, however, maintains a circuit from the positive terminal of the battery 172 through the rails 10 and axle of the train conductors 173, 174, 166, through the electro-magnets 44 of the signals 4 and 5, conductor 167, inter-locking switch 156, back to the negative terminal of the battery 172, so that the signals 4 and 5 are maintained in their off position until the last axle of the train has left the rails 10, when the circuits above mentioned are interrupted, and both the signals 4 and 5 resume their danger positions.

Figure 2:
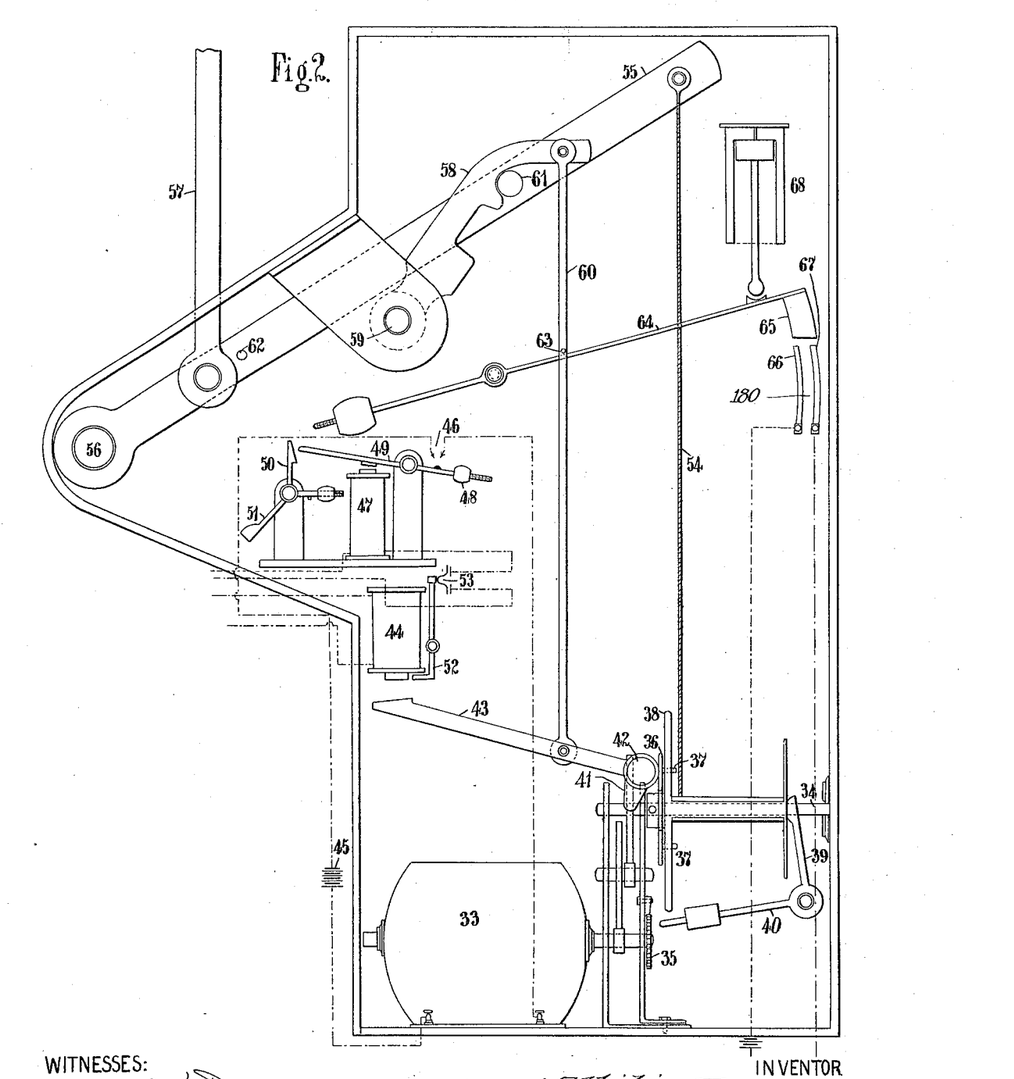
Fig. 2 is a diagrammatic view of a form of electrically controlled operating mechanism for a semaphore signal particularly adapted for use in the system shown in Fig. 1.

The release of armature 43, Fig. 2, of slot magnet 44 of the home signal 5 closes a circuit from the positive terminal of the battery 179 through the switch 180 (which consists of the contacts 65, 66, 67 referred to above and shown in Fig. 2), conductor 168, switch contacts 32, conductor 181 to the rail 1 through the electro-magnets 116 of both the instruments 11, 12 in parallel with one another, rail 2 back to the negative terminal of the battery 179. Both electro-magnets 116 being thus energized, the instruments 11, 12 are unlocked and their levers 134 return to their normal positions. In both instruments disk II changes from red to green; the handle of instrument 11 and the knob of instrument 12 are returned by the respective signalmen into their normal position.

The safety button 150 is provided for enabling a signal of consent to be withdrawn after being once transmitted. A signal of consent is not fully given, for instance by the signalman of station B to the signalman of station A, until the knob 70 of instrument 12 is turned from the position "consent" to the position "block", as has been described above. Supposing that the knob of instrument 12 has been thus moved into the blocked position, if the signalman at B now wishes to cancel the consent given to A he presses the safety button 150 which is connected to a battery 153ᵃ and to the rails 1, 2, as shown at the right of Fig. 1ᵃ relating to station B, when the following circuits are completed:—from the positive terminal of battery 153ᵃ at station B, through the contacts of the safety button 150 and conductor 181, from which point the current traverses two circuits in parallel; one of these circuits consists of rail 1 insulated conductor connected thereto at station A, electro-magnet 116 of instrument 11, contacts 98, 97 of instrument 11, rail 2, and insulated conductors connected thereto, while the other circuit includes the electro-magnet 116 at station B and contacts 110, 111 of instrument 12, both circuits being connected through the contacts of the safety button 150 to the negative terminal of the battery 153ᵃ.

A code of signals (by bell or otherwise) would ordinarily be employed in connection with this safety button, so that one signalman can notify another when he is canceling consent already given or initiated and the signalman who received the canceled consent can notify the other when he has returned the handle of his instrument to its normal position. If the signalman at B has moved the knob of instrument 12 to the consent position and afterward wishes to prevent the signalman at A from at once making use of that consent it is only necessary for him to leave the knob of instrument 12 in the consent position as long as may be desired, as in this position the instrument 11 at station A is blocked at the position control, in which the circuit for lowering the starting signal 3 is not completed; in this case the signalman at B can subsequently move the knob of instrument 12 into its blocked position to allow the train to be started from A whenever he is prepared to receive it. If, on the other hand, the signalman at B after moving the knob of instrument 12 into its consent position finds it necessary to return this (also the handle of instrument 11 in case it has already been moved to its control position) to its normal position before he can accept another train, in this case he must notify the signalman at A by the prearranged signal that he is canceling the consent partially given. The signalman at B would thereupon press the safety button 150 with one hand while with the other he turned the knob of instrument 12 through the "blocked" to the normal position, and would continue to press the safety button until notified by the signalman at A that the handle of instrument 11 also was returned to its normal position. The closing of the safety button would in this case prevent the consent circuit from being completed at station A and would also prevent the instrument 12 at station B from becoming blocked as the releasing electro-magnet 116 would be energized immediately the circuit is closed through the contacts 110, 111 on the shaft 73 of the said instrument. Having discovered that the handle of instrument 11 was in its normal position, the signalman at B could then release the safety button, when both instruments 11 and 12 could be used for a fresh operation.

Figure 10:
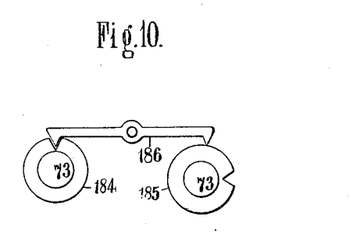
Fig. 10 is a detail view of a portion of the apparatus shown in Fig. 9.

In the case of single track railway systems having signal cabins intermediate the stations, it will be necessary to provide each of the intermediate cabins with a pair of receiving and transmitting instruments similar to the instruments 11, 12 of Fig. 1, that is to say, one instrument for each direction of traffic. An intermediate signal cabin of this kind is illustrated diagrammatically in Fig. 9 of the drawings, the two instruments being shown at 182, 183 respectively. In this case each of the instruments is not provided with the interlocking device 74 (Fig. 6) between the handle 69 and the knob 70, but the knob 70 of the instrument 182 is interlocked with the knob 70 of the instrument 183 by means of the device illustrated in Fig. 10, each of the shafts 73 being provided with a notched disk 184, 185 respectively with which a pivoted interlocking arm 186 is adapted to engage so that when one of the knobs 70 has been moved from its normal position to give consent to a train proceeding in one direction, the knob 70 of the other instrument cannot be moved to give simultaneous consent to a train proceeding in the opposite direction.

The switches indicated at 25, 26 and 31, 32 in Figs. 1 and 1ª are not provided at an intermediate signal cabin. The instruments 182, 183 have additional insulating drums 187, 188 respectively, carrying contacts 189, 190 adapted to engage with contact fingers 191, 192, 193, 194 respectively. Each of these additional insulating drums, together with the contact thereon and the coacting contact fingers corresponds to the insulating drum 86 carrying the contact 90 coacting with contact fingers 99, 100 shown in Fig. 5 and referred to above. Home and distant signals 195, 196 and 197, 198 respectively are provided at the intermediate signal cabin, a pair of insulated rails 199 of the kind already described being interposed at the junction of the two block sections.

The method of arranging the apparatus is very similar to that already described. Assuming that a train is required to proceed past the intermediate signal cabin in the direction from left to right, the bell 112 of instrument 182 is first rung by the signalman in the next cabin to the left in order to ask for the consent of the signalman in the cabin illustrated in Fig. 9. Supposing that the latter wishes to accept the train he answers the bell signal by means of the bell button 149 of instrument 182 and then turns the knob 70 of the same instrument through 90° into its "consent" position, which movement is only rendered possible provided that the knob of instrument 183 occupies its normal position, that is, that no consent has been given for a train to advance from the opposite direction. A circuit is now completed from the positive side of the battery 153ª through the contact fingers 108, 109 of instrument 182 which are connected by contact 105 (Fig. 5), to rail 1ª, thence through the electromagnet 114 and through the following parts of the instrument in the cabin on the left, namely, contact fingers 91, 92 connected by contact 88, contact fingers 106, 107, connected by contact 105, thence to rail 2ª (Fig. 9) and to the negative side of battery 153ª. On being notified by the bell that the handle of the corresponding instrument in the cabin on the left has been moved to "control" position, as described above, the signalman moves the knob 70 of instrument 182 through another 90° to its "blocked" position, in which position the circuit of the battery 153ª is broken at the contacts 108, 109, and the releasing electromagnet 116 of instrument 182 is connected across the rails 1ª, 2ª through the contact fingers 110, 111.

Having made the above movements in instrument 182 the signalman now proceeds to use instrument 183 to obtain consent from the next cabin on the right to lower the signals 196 and 195, that is to allow the train approaching from the left to pass on to the section on the right. "Consent" is received from the cabin on the right by means of a current sent thence along rail 1ᵇ through the following parts of instrument 183, namely, through electromagnet 114, contact fingers 91, 92, connected by contact 88, contact fingers 106, 107, connected by contact 105 thence to rail 2ᵇ and back to said cabin on the right. The signalman is thereby enabled to move the handle 69 on instrument 183 successively into the "control" and "consent" positions, described above, in which positions the releasing magnet 116 of instrument 183 is connected across the rails 1ᵇ, 2ᵇ, through the contact fingers 97, 98, connected by the contact 89 (Fig. 5). When the handle of instrument 183 is brought into the "consent" position a circuit is completed from the positive side of battery 153ᵇ through the contact fingers 95, 96, connected by contact 88, contact fingers 137, 138, connected by contact 136 (Fig. 4), contact fingers 129, 130, connected by contact 128 (Fig. 4), contact fingers 93, 94, connected by contact 87 (Fig. 5), thence through slot magnet 44 of home signal 195 and back to the negative side of battery 153ᵇ. The slot magnet 44 of home signal 195 is now energized and attracts its armature 52 (Fig. 2) to close the switch 53 and circuit of magnet 47. The signalman now closes the button switch 17 for signal 195 when a circuit is completed from the positive side of battery 153ᵇ through button switch 17 and the winding of magnet 47 of signal 195 and thence back to the negative side of the same battery. Signal 195 moves to its off position, thus closing signal switch 170ª when a shunt circuit to that mentioned above, through slot magnet 44 of home signal 195, is completed through slot magnet 44 of distant signal 196 and through signal switch 170ª, thus energizing the latter slot magnet. The signalman now presses button switch 18, thus closing the circuit of magnet 47 of distant signal 196, and thus causes this signal also to come into its off position.

The train now approaches from the left and successively passes the distant and home signals 196 and 195. As soon as the front wheels of the train engage the short length of rail 199 a circuit is completed from the positive side of battery 199ª through the slot magnet 44 of home signal 195, thence to the upper short rail 199, through the train wheels and axle to the lower rail 199, and thence back to the negative side of battery 199ª; simultaneously another circuit is completed from the same battery through conductor 166ª, contacts 94, 93, and electromagnet 115 of instrument 183 to the upper rail 199, and thence as before through the train wheels and axle to the lower rail 199

Figure 11:
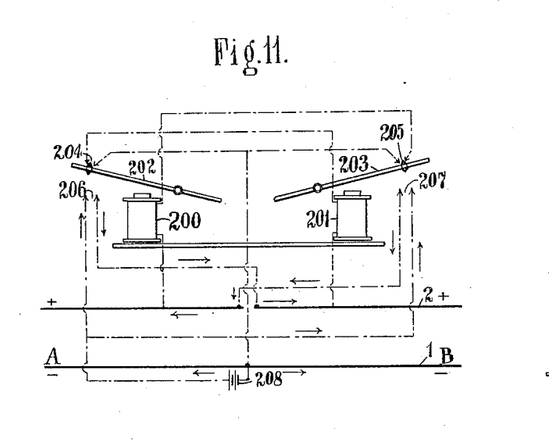
Fig. 11 is a diagrammatic view of a rail connection which may be employed in connection with the system shown in Figs. 1 and 1ª.

The operation of the relays is as follows:—A current entering the rail 2 on the A side, passes through the electro-magnet 200, switch 205, back to the other rail 1; the electro-magnet 200 being thus energized, closes a local circuit from the positive terminal of the battery 208 through the switch 206 to the rail 2, thereby supplying current to the section of the track on the B side of the sub-division. A contrary action takes place if current enters the track from the B side, the electro-magnet 201 in this case being energized.

It will be readily appreciated by those skilled in the art that the electro-magnets 44 of the signal operating mechanism constitute "slot" magnets.

The arrangements which have been described herein are only illustrative, and it is evident that these may be considerably modified in detail and still come within the scope of the invention which is not restricted to the particular arrangements and forms described and illustrated in the drawings. For instance, in place of the short lengths of insulated rails 9, 10 and 199 shown in Figs. 1, 1ª and 9 respectively, any known type of treadle switch may be employed which is adapted to close a circuit when a train or vehicle passes over it and to retain the circuit closed during the whole time that the train or vehicle is passing over it. Hence in the claims the term "treadle" must be understood as including both the said short sections of rails and also such treadle switches.

What I claim is:—

1. In a railway block signaling system, the combination with a block section of a track, a signal and a signal station at each end equipped with a block instrument and a source of current, of a slot magnet controlling each signal, an operating member in each instrument controlling the corresponding slot magnet, electrical connections through each instrument to the track rails, means in each instrument for controlling the operating member of the other instrument through the track connections, and means in each instrument controlled by the trains for controlling both the corresponding slot magnet and the corresponding operating member.

2. In a railway block signaling system, the combination with a block section of track, a signal station and a source of current, of an electrically operated signal for the said section, a relay electro-magnet controlling the operating circuit of the signal, a "slot" electro-magnet controlling the circuit of the relay, manually operated means at one end of the section for making and breaking the circuit of the "slot" electro-magnet and manually operated means at the other end of the section controlling the manually operated means at the first mentioned end of the same.

3. In combination in a railway block signaling system, a block instrument, a shaft in the instrument for controlling the operation of a signal, a device for preventing the rotation of the shaft in one direction, a lock operated by the rotation of the shaft when setting the signal to lock the shaft in its operative position, a gravity catch for retaining this lock in locking position, an electro-magnet controlling the catch, contacts controlled by the rotation of the shaft for connecting the electro-magnet across the track rails, and means controlled by passing trains for energizing the track circuit and thus automatically unlocking the instrument.

4. In a railway block signaling system, the combination with a block section of track, a block instrument at each end, an operating member in each, a mechanical lock in each instrument for retaining the operating member in operative position, and an electro-magnet in each instrument for unlocking the corresponding operating member, of a circuit including the track rails of the section, the unlocking magnets of both instruments and a source of current, and means controlled by the trains for closing the said circuit to simultaneously unlock both instruments.

5. In combination in a railway block signaling system, a block section of track, a block instrument at each end, an operating member in each, a mechanical lock in each instrument for retaining its operating member in an operative position and an electromagnet in each instrument for unlocking the operating member, a circuit including the track rails of the section the unlocking magnets of both instruments and a source of current, a switch controlling the said circuit, a signal, mechanism simultaneously controlling the movement of the signal to danger position and the closing of the switch, and means controlled by the trains for operating the said mechanism.

6. In combination in a railway block signaling system, a block section of track, a signal station at each end equipped with a block instrument, an operating member in each instrument, a lock adapted to lock the corresponding operating member against further movement after being moved into operative position, an electro-magnet in each instrument controlling the lock, a circuit including the track rails the electro-magnet of each instrument and a source of current, and an emergency switch at either station adapted to close the said circuit and unlock both instruments in order to cancel the permission, previously given, for the passage of a train along the section.

7. In a railway signaling system, the combination with a signal, an electro-magnet controlling the same, of two separate circuits for energizing said electro-magnet, a source of current in each circuit, a manually operated switch device in one circuit for energizing the signal magnet, an electro-magnet for opening the said switch device and connected in the second mentioned circuit, and a means to close the second mentioned circuit by passing trains, thus cutting out the signal electro-magnet from the first mentioned circuit and simultaneously energizing it from the other circuit so long as any part of a train is in operative engagement with the last named means.

8. In a signaling system for a single track railway, the combination with electrically controlled signals for both directions of traffic, of a circuit closing means controlled by trains passing in both directions, wires connecting the said means with all the signals and with a source of current, fixed contacts in the signal circuit for one direction of traffic, other fixed contacts in the signal circuit for the other direction of traffic and a movable member having two positions, coacting with both sets of fixed contacts, in one of which positions only one signal circuit, and in the other position only the other signal circuit can be closed by the circuit closing means.

9. In combination in a single track railway block signaling system, two contiguous insulated sections of track, a signal for controlling trains passing from one section to the other in one direction, and other signal for controlling trains passing in the other direction, a separate slot magnet controlling each signal, a manually operated switch controlling the slot circuit of one signal, a manually operated switch controlling the slot circuit of the other signal, a single track circuit closer controlled by trains passing in both directions, and connections thereto for controlling one or the other of the manually operated switches and the corresponding slot magnet as long as any part of the train engages the circuit closer.

In witness whereof I have hereunto set my signature in the presence of two witnesses.

ATTILIO BEER

Witnesses:
G. B. ZANARDO,
G. BIGSARI.

Copies of this patent may be obtained for five cents each, by addressing the "Commissioner of Patents, Washington, D. C."